United States Patent [19]
Roantree

[11] 3,987,682
[45] Oct. 26, 1976

[54] VARIABLE SPEED TRANSMISSION

[75] Inventor: William J. Roantree, Port Washington, N.Y.

[73] Assignee: Cyclecentric Corporation, Port Washington, N.Y.

[22] Filed: July 11, 1974

[21] Appl. No.: 487,655

[52] U.S. Cl. ................................................ 74/117
[51] Int. Cl.² ...................................... F16H 29/04
[58] Field of Search ................................... 74/117

[56] References Cited
UNITED STATES PATENTS

| 787,830 | 4/1905 | Conant | 74/117 |
|---|---|---|---|
| 1,641,902 | 9/1927 | Ditter | 74/117 |
| 1,957,196 | 5/1934 | Bonnet | 74/117 |
| 3,156,124 | 11/1964 | Miller | 74/117 |

FOREIGN PATENTS OR APPLICATIONS

| 530,512 | 1/1954 | Italy | 74/117 |
|---|---|---|---|

Primary Examiner—Samuel Scott
Assistant Examiner—Wesley S. Ratliff, Jr.
Attorney, Agent, or Firm—Brooks Haidt Haffner & Delahunty

[57] ABSTRACT

A positive infinitely variable transmission mechanism employs sprags to transmit torque from a driving member to a driven member. By varying the extent by which the driving and driven members depart from a concentric relationship, the sprags impart additional motion, by a toppling action, thus providing different drive ratios. The invention is exemplified by a bicycle transmission arrangement wherein a chain driven input drum is mounted in selectively eccentric driving relationship with an output drum on the axial shaft of a wheel.

17 Claims, 4 Drawing Figures

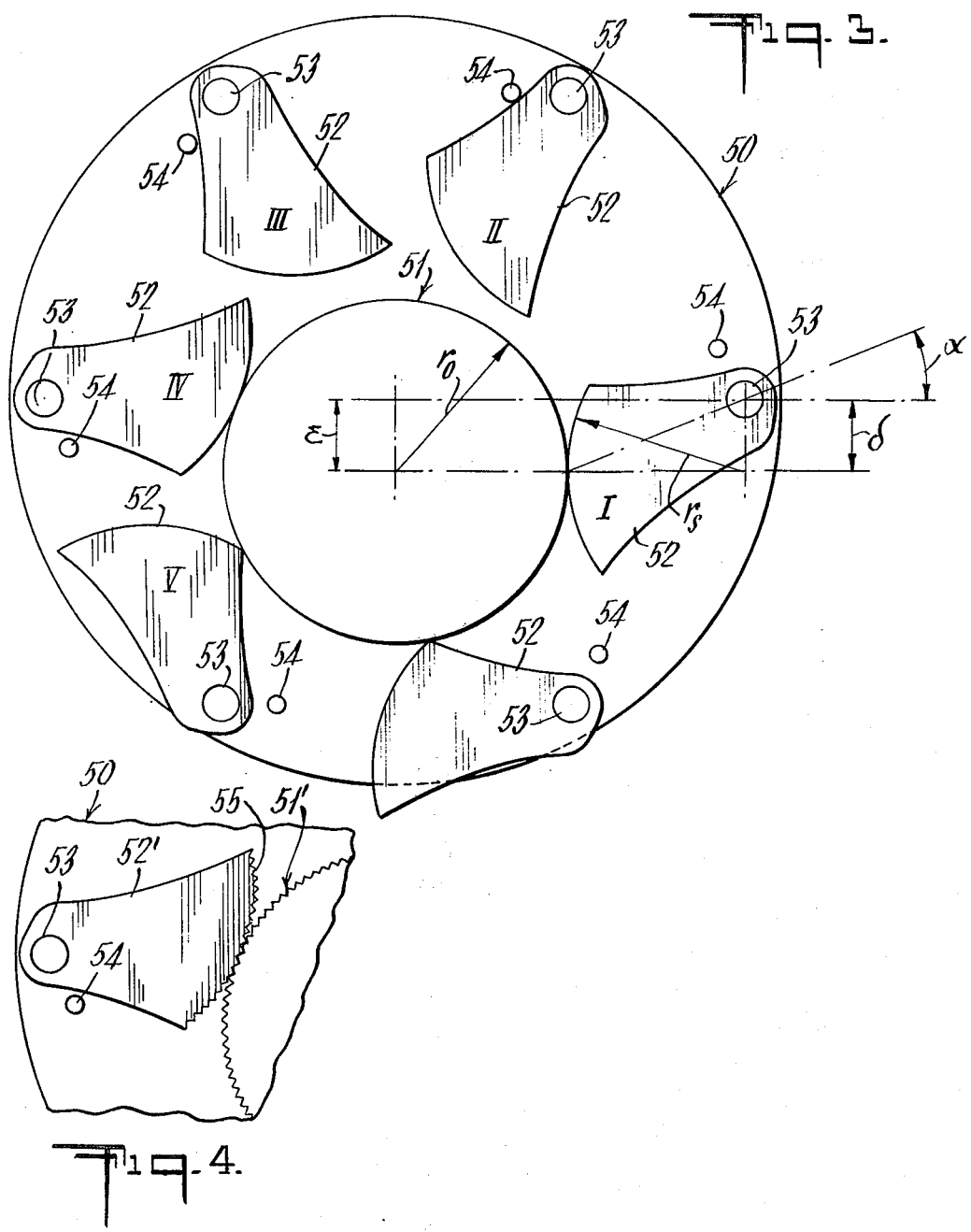

VARIABLE SPEED TRANSMISSION

BACKGROUND OF THE INVENTION

1. Field of the Invention

The invention relates to the selectively variable transmission of rotational motion and more particularly to a variable transmission arrangement wherein sprags transmit torque between eccentrically journalled input and output members whereby control of the degree of eccentricity determines the drive ratio.

2. Description of the Prior Art

One type of overrunning clutch employs a plurality of sprags interposed between a pair of concentrically mounted rotatable members to transmit rotational motion in only one direction from a driving to a driven member. The sprags used are so positioned and have their friction surfaces so contoured as to divide the load as equally as possible among the several sprags of the clutch and to assure sufficient tangential friction on each sprag to meet torque requirements. Because of the use of a jamming drive angle in sprag clutches, slipping is eliminated and the drive forces are proportional to the output torque, so that the clutch is heavily loaded only when demand is heavy. The transmission of the present invention has certain features, such as the use of a jamming angle, in common with sprag clutches.

Because the present invention is exemplified by an embodiment particularly suited for use as a bicycle transmission, it should be noted that a wide variety of bicycle transmission systems have been proposed, and a number of different systems are found on modern bicycles. Two speed, three speed and five speed bicycles are available that have transmissions built into their rear hubs. Another popular type of bicycle transmission is the "derailleur", a chain drive in which the chain is shifted from one to another of a plurality of coaxially mounted sprockets to change the drive ratio. A disadvantage of the derailleur system is that the transmission should not be loaded while shifting from one sprocket to another. Derailleur systems are typically quite sensitive and demand frequent repair and adjustment.

SUMMARY OF THE INVENTION

In its broad concept the preesent invention employs the concept of a jamming drive angle, with its advantage of avoiding slippage, but unlike the sprag clutch wherein driving and driven members are always concentric, the input and output members of the present invention are intentionally journalled eccentrically. Since the driving and driven members are not concentrically journalled, the individual sprags do not all have the same relative orientation with respect to the driving and driven members. As the system rotates, each sprag moves through different relationships with the driven member, the curved surface of the sprag "rolling" over the driven member and thereby imparting additional rotational motion to the driven member. The amount of increased motion imparted is, within certain limits, proportional to the amount of eccentricity, so by varying the eccentricity of the relationship of the driving and driven members, a variable drive ratio is obtained. Thus by departing from the constraint imposed on the sprag clutch by the concentricity of the input and output members, while retaining the effective jamming drive, a highly versatile yet simple variable speed transmission is provided in accordance with the invention.

It is believed that there are numerous applications for the transmission system of the invention, but a clear understanding of the structure and function of the invention can be obtained from the description of an illustrative embodiment in which the driven and driving members are drum-like in shape and means are provided for moving the axis of one of the drum-like members toward and away from the axis of the other to provide the varying degree of eccentricity that results in a variable drive ratio.

The transmission of the invention can be employed as a highly effective bicycle transmission compatible with conventional design standards for other parts of a bicycle. In this application as a bicycle transmission, the output member is a drum secured to the hub of a bicycle rear wheel for rotation therewith and the input member is a relatively larger drum having a sprocket for engaging the conventional bicycle chain. A set of sprags interposed between the input and output drums are pivotally mounted at equally arcuately spaced positions on pins mounted on the input member. The sprags are urged toward contact with the output drum by spring means, and means are provided for preventing undesired side motion of the sprags. To provide a controlled amount of eccentricity, that is, of displacement of the axes of the input and output drums, a slider mechanism is mounted on the input member for sliding movement in response to a shift control lever.

The invention will be more fully understood from the following detailed description of preferred embodiments, especially when that description is read in conjunction with the accompanying figures of the drawing.

BRIEF DESCRIPTION OF THE DRAWING

FIG. 3 is a schematic illustration of the operation of a transmission system according to the invention.

FIG. 4 is a detail view of a modified sprag according to the invention.

DETAILED DESCRIPTION OF PREFERRED EMBODIMENTS

Figure 1:
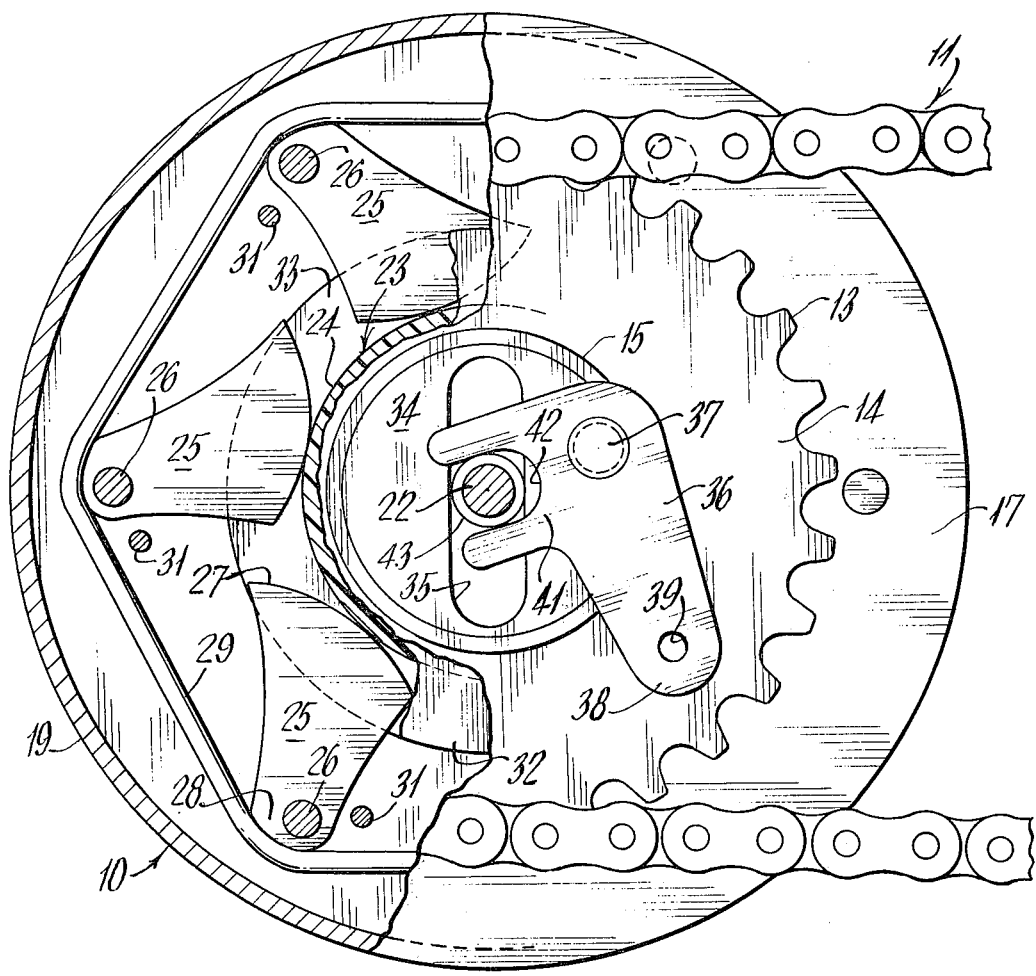
FIG. 1 is a view from the side of a transmission system in accordance with the invention as applied to a bicycle, partially cut away to reveal internal parts.
Figure 2:
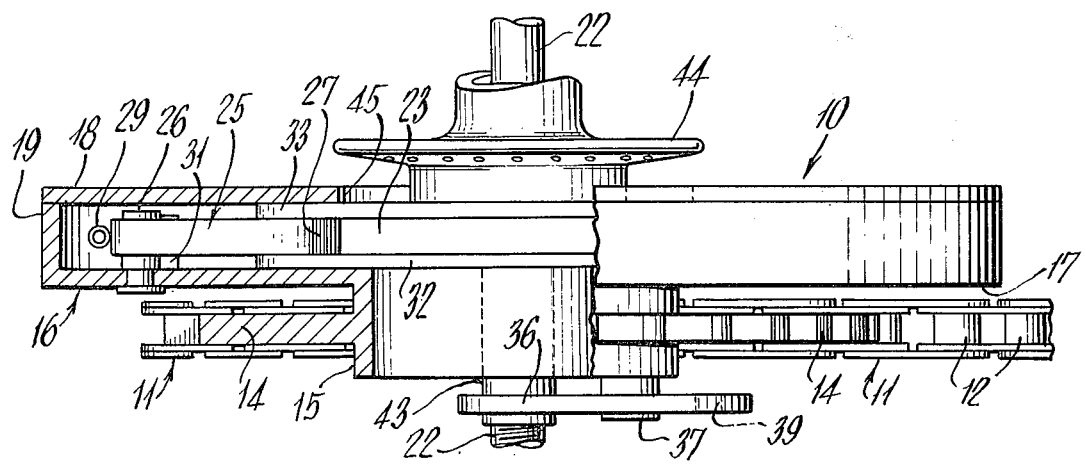
FIG. 2 is a top view, partially in section, of the mechanism of FIG. 1.

FIGS. 1 and 2 show a transmission mechanism 10 in accordance with the invention as applied to a bicycle. Since the mechanism 10 is compatible with a wide variety of conventional bicycle designs, the frame, etc. of the bicycle need not be illustrated. In FIGS. 1 and 2, the roller-chain 11 can be a conventional bicycle roller chain suitably engaged in a known manner with a sprocket driven by pedals (not shown). Rollers 12 of the roller-chain 11 engage the teeth 13 of a sprocket 14 as in the ordinary bicycle drive arrangement, so that by pedaling, the chain 11 and the sprocket 14 are caused to move in a clockwise direction.

As shown in FIGS. 1 and 2, the sprocket 14 extends radially outward from a cylindrical journal 15. At its inner end the journal is mounted on an input drum generally designated 16. This drum 16 has parallel outer and inner faces 17 and 18 joined at their circumference by a cylindrical wall 19. The input drum 16 rotates with the sprocket 14 mounted thereon and can be considered as the driving member in the transmission.

Extending through the input drum 16 and perpendicular to its faces 17, 18, is a fixed shaft 22, which, in this case, is the rear axle of the bicycle. Journaled on this fixed shaft 22 is a hub 44 to which the inner end of the wheel spokes are affixed. The output drum 23 is threaded onto this hub 44, and a clearance hole 45 is provided therefor in the face 18 of the input drum. If the hub 44 were secured to the center of the drum 16 for rotation therewith, the bicycle wheel would be geared to a fixed drive speed directly proportional to the ratio of the number of teeth of the rear sprocket 14 and the front sprocket.

The hub 44 is, however, not fixed to the center of the drum 16, and the center of the drum 16 can move with respect to the shaft 22, while remaining parallel to that axis. The cylindrically shaped output drum 23 is coaxially secured to the hub 44 for rotation therewith. This output drum 23 is housed within the input drum 16 as best shown in FIG. 2. The annular outer surface of the output drum 23 must have a high coefficient of friction, and this characteristic is provided, in the embodiment shown, by a coating 24 of a synthetic resinous material such as polyurethane.

Torque is transmitted from the input drum 16 to the output drum 23 and hub 44 by the jamming action of a plurality of identical sprags 25, six of which are employed in the embodiment of FIGS. 1 and 2, although a larger or smaller number could be used in this or other applications. Each sprag is a flat member pivotally secured to the input drum by means of a pivot pin 26 mounted in the front face 17 of the input drum 16. In the six-sprag embodiment shown, these pivots are equally spaced 60° apart from each other around the axis of drum 16.

For driving contact with the surface 24 of the output drum 23, each sprag 25 is formed with a curved driving end surface 27. On the opposite side of their pivot pins 26 from their driving ends 27, the sprags 25 have a protruding cam portion 28. The cam portions 28 of the sprags cooperate with a spring belt 29 which urges the sprags 25 toward an orientation with the driving ends 27 facing the output drum 23. This spring belt can be a garter spring as shown or an O-ring of elastic material. A stop pin 31 adjacent each sprag 25 prevents pivoting movement of the sprag beyond a certain point. These stop pins 31 are shown secured to the input drum 16 near the points at which the pivot pins 26 are mounted, but somewhat closer to the axis of the drum 16. Tension in the spring belt 29 tends to push the sprags 25 into abutment with the respective stop pins 31.

A pair of guide plates 32 and 33 positioned within the input drum 16 on opposite sides of the sprags 25 prevent side motion of the sprags. These plates 32, 33 are slightly farther apart than the thickness of the sprags 25 so the sprags are free to pivot on their pins 26.

As indicated the output drum 23 is coaxially mounted on the shaft 22, whereas the input drum 16 is movable in a plane perpendicular to the axis of the shaft 22. The relative position of the output drum 23 with respect to the input drum governs the action of the sprags 25 on the output drum 23 and hence governs the drive ratio of the mechanism. A preferred arrangement for keeping the input drum 16 perpendicular to the shaft 22 while permitting displacement of the axis of the drum 16 relative to the shaft 22 is shown in FIGS. 1 and 2. A control slider 34 is journalled within the input drum 16 and slidably mounted on a slider block 35. The input drum 16 can thus move up or down from the position shown in FIG. 1. To control this sliding adjustment, and to hold the input drum in a selected position, a shifting lever 36 is preferably employed. As shown in FIG. 1, the shifting lever 36 is pivoted on a fulcrum 37 and an arm 38 of the lever 36 has means, shown as a hole 39 for attachment to a control cable or the like, for actuation of movement of the lever 36 by a control at a remote location, say on the handlebars of a bicycle equipped with the transmission of the invention. Another arm 41 of the lever 36 extends generally perpendicular to the arm 38 and has a slot 42 embracing the shaft 22. A bushing 43 is shown surrounding the shaft 22 within the slot 42.

The operation of the transmission shown in FIGS. 1 and 2 is schematically illustrated in FIG. 3. It should be understood that the transmission system of the invention has numerous applications besides that of the bicycle transmission mechanism particularly illustrated in FIGS. 1 and 2, and although reference will be made to those figures in the following discussion, more general principles will also be presented.

In FIG. 3, a driving member 50 is shown eccentrically positioned with respect to a driven member 51. The extent of the eccentricity is called $\epsilon$, which in the case of cylindrical input and output drums as in FIGS. 1 and 2 is the distance between the axes of the drums. The driving member 50 carries a plurality (six shown) of sprags 52, mounted to pivot about equally arcuately spaced points 53. Stops 54 are provided to prevent excessive rotation of the sprags, as illustrated by sprags II and III in FIG. 3.

It will be noted that because the input member 50 is eccentrically located with respect to the output member 51, the surfaces of these members converge at the right side in FIG. 3 and then diverge at the left as the system rotates in a clockwise sense. The input member carries the successive sprags into and through the convergent sector and later through the divergent sector. The relative dimensions of the parts are chosen so that when a sprag is in the position of sprag I in the convergent sector, it must topple about its pivot point. Because of the shape of the sprag, this toppling does not appreciably change the angle of contact of the sprag's driving end surface with the output member, but does introduce additional motion as the sprag rolls on the surface of the output member 51. This rolling increases the speed of rotation of the output member 51 relative to that of the input member 50. The amount of increased motion, is, within certain limits, directly proportional to the amount of eccentricity $\epsilon$.

In the embodiment of FIG. 3, single ended sprags 52 are pivotally mounted at fixed points on the input member 50. Single ended sprags are employed here rather than double ended ones to avoid duplication of frictional surfaces.

The driving ends of the sprags 52 are formed on a radius $r_s$ and the center associated with the end radius $r_s$ is displaced from the pivot point at 53 by a distance $\delta$.

Sprag I in FIG. 3, which is in the convergent sector, is in driving relationship, jammed between its pivot point 53 and the output member 51 and the angle $\alpha$ is the so-called drive angle. This angle $\alpha$, as will be seen upon consideration of the geometry of the system and fully understood by those acquainted with sprag clutches, stays substantially constant while the radiused end of the sprag is in contact with the output member 51, resulting in the jamming drive.

The geometry of this system is such that a two to one speed increase or drive ratio results when the sprag radius $r_s$ is equal to the radius $r_o$ of the output member and the offset or displacement $\delta$ of the sprag radius center from the pivot point of the sprag is equal to the eccentricity $\epsilon$. Decreasing the eccentricity $\epsilon$ decreases the drive ratio so that a one to one drive ratio is reached when $\epsilon = 0$, that is, when the members 50 and 51 are concentric.

The drive ratio can generally be expressed in terms of the other quantities as follows:

$$R = 1 + (\epsilon r_s/\delta r_o).$$

Thus, when the one to one ratio exists the drive is perfect. The drive is also perfect when $\epsilon = \delta$, but some error exists in the velocity profile in the intermediate range, $o < \epsilon < \delta$. This error is related to the number of sprags as well as other variables. The drive ratio will be seen however to be infinitely variable by control of the eccentricity $\epsilon$.

It will be seen that, because of the eccentricity, some of the sprags, II and III in FIG. 3, are not in contact with the output member, a condition which would be avoided in a sprag clutch where even load distribution is essential. The sprags II and III, resting against their stop pins 54, do not affect operation of the transmission. By proper positioning of the stop pin 54, each sprag will present its end surface at the drive angle $\alpha$ to the output drum when it reaches the driving position at the convergent sector.

By way of contrast between the invention and the sprag clutch, it should be noted that the drive angle $\alpha$ in a sprag clutch is ordinarily less than 10°, whereas the transmission of the present invention uses a drive angle between 10 and 20° to limit journal loads. Because of this, a high coefficient of friction is required, and as previously indicated this can be achieved by applying a suitable coating to the output member. The end faces of the sprags themselves could be coated with friction material. It is also possible to provide a plurality of ratchet teeth on the driving end of the sprags as shown in FIG. 4, to cooperate with similarly spaced teeth on the output member. The use of teeth would limit the transmission to a finite number of drive ratios and would introduce some roughness, but in some applications a toothed arrangement could be advantageous. Still another way to increase the effective coefficient of friction is to provide mating V grooves on the sprag ends and the output member.

These and other variations and modifications of the transmission are considered to be within the spirit and scope of the invention.

What is claimed is:

1. A variable speed transmission comprising a rotatable output member having a cylindrical friction surface, a rotatable input member having its axis of rotation movable with respect to the axis of rotation of said output member, and a plurality of pivotally mounted sprags interposed between said input and output members for transmitting rotational motion from said input member to said output member, each of said sprags having an end surface curved on a radius of curvature about a center of curvature which center of curvature is displaced from the pivot point of the sprag for rolling and jamming frictional engagement with said cylindrical friction surface to cause said output member to rotate at a rate equal to the rate of rotation of said input member plus an amount proportional to the extent of relative displacement of said axes, so that the drive ratio R can be expressed generally as follows:

$$R = 1 + (\epsilon r_s/\delta r_o)$$

wherein $r_o$ is the radius of said cylindrical output member; $r_s$ is the radius of curvature of the curved end surface of each said sprag; $\epsilon$ is the distance between said axes; and $\delta$ is the displacement of the center of curvature of each said sprag's curved end surface from the pivot point of such sprag, whereby the drive ratio can be varied by changing the distance between said axes of rotation.

2. The transmission of claim 1 wherein said sprags are mounted on said input member.

3. The transmission of claim 1 including means maintaining said axes of rotation mutually parallel while permitting lateral displacement to effect change in distance.

4. The transmission of claim 1 including means for controlling the distance between said axes of rotation.

5. The transmission of claim 1 wherein said curved sprag end surfaces and said cylindrical friction surface have mating V grooves to increase the effective coefficient of friction therebetween.

6. A variable speed transmission comprising: a rotatably mounted output drum having an outer cylindrical friction surface; a rotatably mounted input drum having its axis parallel with but selectively laterally displaceable with respect to the axis of rotation of said output drum, a plurality of sprags pivotally mounted on said input drive, each of said sprags having a curved end surface curved on a radius of curvature displaced from the pivot point of said sprag for rolling and jamming frictional engagement of said curved end surface with said outer cylindrical frictional surface to cause said output drum to rotate at a rate equal to the rate of rotation of said input drum plus an amount proportional to the extent of relative lateral displacement of said axes of rotation said rate being controllable by changing the lateral distance between said axes of rotation; and sliding means for maintaining a selected lateral distance between said axes of rotation.

7. The transmission of claim 6 wherein each said sprag is mounted on a pivot pin, said pins extending parallel to the axis of rotation of said input drum at equally arcuately spaced positions, and including means urging said sprags towards contact with said output drum.

8. The transmission of claim 7 wherein a stop pin is provided adjacent each sprag for limiting the pivotal motion of said sprags.

9. The transmission of claim 6 wherein said curved sprag end surfaces and said outer cylindrical surface have mating V grooves to increase the effective coefficient of friction therebetween.

10. The variable speed transmission of claim 6 wherein the curved end surface of each said sprag has a plurality of teeth for engagement with cooperating teeth of said output drum.

11. In a bicycle transmission for use in a bicycle of the type wherein a chain drives a sprocket to turn the hub of a wheel, an input drum mounted on a sprocket for rotation therewith, an output drum mounted on a hub, a plurality of sprags interposed radially between said input and output drums, said sprags being pivotally mounted on said input drum, each of said sprags having a driving end surface curved on a radius about a center displaced from the pivot point of said sprag, means urging said sprags toward contact with said output drum, and slider means journalled within said input drum for permitting said input drum to be moved out of concentric relationship with said output drum, the rate of rotation of said hub being controlled by sliding movement of said input drum with respect to said output drum to control the amount of eccentricity.

12. The transmission of claim 11 wherein the means urging said sprags toward contact with said output drum is a spring belt encompassing all of said sprags, each sprag having a protruding cam portion on the opposite side of the sprag pivot point from said driving end surface cooperating with said spring belt.

13. The transmission according to claim 11 and including a lever cooperating with said slider means for controlling the amount of said eccentricity.

14. The transmission of claim 11 wherein the driving end surfaces of said sprags and the output drum have mating V grooves to increase the effective coefficient of friction therebetween.

15. The transmission of claim 11 and including stop pin means adjacent each sprag for limiting the pivotal motion of said sprags to keep the end surfaces of one or more sprags out of engagement with said output drum while at least one other sprag is in driving engagement with said output drum when said drums are not in substantially concentric relationship.

16. A variable speed transmission comprising a rotatably mounted output member, a rotatably mounted input member having its axis of rotation movable with respect to the axis of said output member, and a plurality of sprags interposed between said input and output members for transmitting rotational motion from said input member to said output member by means of which increased motion is imparted to said output member in proportion to the amount of displacement of one of said members with respect to the other of said members, said sprags having driving surfaces curved on a radius for engaging said output member at a point of contact and at a jamming angle so that relative displacement of said members causes said point of contact to move along said curved driving surface during rotation of said members, the extent of movement of said point of contact along said driving surface being proportional to the extent of relative displacement of said members.

17. A variable speed transmission comprising a rotatable output member having a cylindrical friction surface, a rotatable input member having its axis of rotation movable with respect to the axis of rotation of said output member, and a plurality of pivotally mounted sprags interposed between said input and output members for transmitting rotational motion from said input member to said output member, each of said sprags having an end surface curved on a radius of curvature about a center of curvature which center of curvature is displaced from the pivot point of the sprag for rolling and jamming frictional engagement with said cylindrical friction surface to cause said output member to rotate at a rate equal to the rate of rotation of said input member plus an amount proportional to the extent of relative displacement of said axes whereby the drive ratio can be varied by changing the distance between said axes of rotation said transmission including stop pin means provided adjacent each of said sprags for limiting pivotal movement, each sprag having a protruding cam portion at a sprag end opposite from said friction surface, and spring belt means encompassing all of said sprags cooperating with said cam portion to urge the sprags into engagement with said output member.

* * * * *